United States Patent
Wang

(10) Patent No.: US 12,503,051 B2
(45) Date of Patent: Dec. 23, 2025

(54) VEHICULAR CAMERA FOCUS TEST SYSTEM USING LIGHT COLLIMATOR IN CONTROLLED TEST CHAMBER

(71) Applicant: Magna Electronics Inc., Auburn Hills, MI (US)

(72) Inventor: Jianguo Wang, Troy, MI (US)

(73) Assignee: Magna Electronics Inc., Auburn Hills, MI (US)

( * ) Notice: Subject to any disclaimer, the term of this patent is extended or adjusted under 35 U.S.C. 154(b) by 350 days.

(21) Appl. No.: 18/191,338

(22) Filed: Mar. 28, 2023

(65) Prior Publication Data

US 2023/0311770 A1 Oct. 5, 2023

Related U.S. Application Data

(60) Provisional application No. 63/362,061, filed on Mar. 29, 2022.

(51) Int. Cl.
*B60R 1/24* (2022.01)
*G06T 7/80* (2017.01)

(52) U.S. Cl.
CPC .................. *B60R 1/24* (2022.01); *G06T 7/85* (2017.01); *B60R 2300/105* (2013.01); *G06T 2207/30252* (2013.01)

(58) Field of Classification Search
CPC ....... B60R 1/24; B60R 2300/105; G06T 7/85; G06T 2207/30252; G06T 7/80
See application file for complete search history.

(56) References Cited

U.S. PATENT DOCUMENTS

| | | |
|---|---|---|
| 5,550,677 A | 8/1996 | Schofield et al. |
| 5,670,935 A | 9/1997 | Schofield et al. |
| 5,949,331 A | 9/1999 | Schofield et al. |
| 7,038,577 B2 | 5/2006 | Pawlicki et al. |
| 7,720,580 B2 | 5/2010 | Higgins-Luthman |
| 7,855,755 B2 | 12/2010 | Weller et al. |
| 10,071,687 B2 | 9/2018 | Ihlenburg et al. |
| 10,099,614 B2 | 10/2018 | Diessner |
| 11,012,684 B2 | 5/2021 | Sesti et al. |
| 11,889,051 B2 | 1/2024 | Sesti et al. |
| 2002/0050988 A1 | 5/2002 | Petrov et al. |
| 2005/0089208 A1 | 4/2005 | Dong et al. |
| 2006/0038910 A1 | 2/2006 | Knoedgen et al. |
| 2006/0038976 A1 | 2/2006 | Knoedgen et al. |
| 2007/0211240 A1 | 9/2007 | Matsumoto et al. |
| 2014/0152845 A1 | 6/2014 | Seger et al. |
| 2015/0138372 A1 | 5/2015 | Apel et al. |

(Continued)

*Primary Examiner* — John R Wallace
(74) *Attorney, Agent, or Firm* — HONIGMAN LLP

(57) ABSTRACT

A method for testing a vehicular camera includes providing a vehicular camera and an environmentally-controlled chamber that has a window allowing visible light to pass into the interior of the chamber. A light-collimating device is provided exterior the environmentally-controlled chamber, and the vehicular camera is disposed within the interior of the environmentally-controlled chamber. Light emitted by the device passes through a window of the chamber to project a target within the chamber. Image data is captured with the vehicular camera that includes at least a portion of the projected target. Responsive to processing by an image processor of image data captured by the vehicular camera, a characteristic of the vehicular camera is estimated.

21 Claims, 6 Drawing Sheets

(56) References Cited

U.S. PATENT DOCUMENTS

| | | |
|---|---|---|
| 2015/0277135 A1 | 10/2015 | Johnson |
| 2017/0006282 A1 | 1/2017 | Sigle |
| 2017/0132774 A1 | 5/2017 | Ruprecht et al. |
| 2017/0234923 A1 | 8/2017 | Douglas et al. |
| 2017/0287166 A1 | 10/2017 | Claveau et al. |
| 2018/0113321 A1 | 4/2018 | Heshmat Dehkordi et al. |
| 2018/0302615 A1 | 10/2018 | Lehmann et al. |
| 2018/0373944 A1 | 12/2018 | Sesti et al. |
| 2020/0084436 A1 | 3/2020 | Patterson |
| 2022/0070438 A1* | 3/2022 | Cho ................... H04N 17/002 |
| 2023/0146505 A1* | 5/2023 | Muhassin ............ G01M 11/083 73/865.6 |

* cited by examiner

VEHICULAR CAMERA FOCUS TEST SYSTEM USING LIGHT COLLIMATOR IN CONTROLLED TEST CHAMBER

CROSS REFERENCE TO RELATED APPLICATION

The present application claims the filing benefits of U.S. provisional application Ser. No. 63/362,061, filed Mar. 29, 2022, which is hereby incorporated herein by reference in its entirety.

FIELD OF THE INVENTION

The present invention relates generally to a vehicular vision system for a vehicle and, more particularly, to a testing system for a vehicular vision system that utilizes one or more cameras.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

A method for testing a vehicular camera includes providing a vehicular camera and providing an environmentally-controlled chamber. The environmentally-controlled chamber includes a window allowing visible light to pass from the exterior of the environmentally-controlled chamber into the interior of the environmentally-controlled chamber. The method includes positioning a light-collimating device exterior the environmentally-controlled chamber. With the light-collimating device operating to emit collimated light, collimated light emitted by the light-collimating device passes through the window of the environmentally-controlled chamber to project a target within the environmentally-controlled chamber. The method also includes disposing the vehicular camera within the interior of the environmentally-controlled chamber. With the light-collimating device operating to emit collimated light that passes through the window of the environmentally-controlled chamber to project the target within the environmentally-controlled chamber, the vehicular camera views at least a portion of the projected target within the environmentally-controlled chamber. With the vehicular camera disposed within the interior of the environmentally-controlled chamber, and with the light-collimating device operating to emit collimated light, the method includes capturing image data with the vehicular camera. The method also includes processing, via an image processor, the captured image data and, responsive to processing by the image processor of the captured image data, estimating a characteristic of the vehicular camera.

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
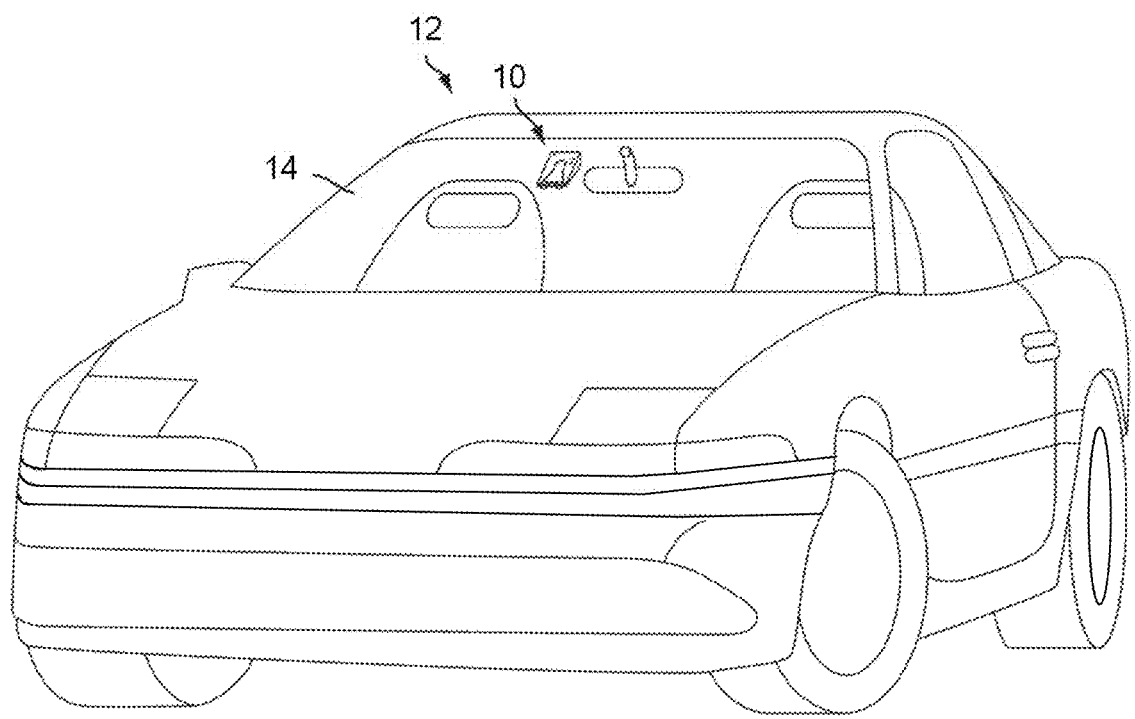
FIG. 1 is a perspective view of a vehicle with a vision system that incorporates at least a forward camera module.

Referring now to the drawings and the illustrative embodiments depicted therein, a vision system 10 for a vehicle 12 includes at least one exterior viewing imaging sensor or camera, such as a forward viewing imaging sensor or camera, which may be disposed at and behind the windshield 14 of the vehicle and viewing forward through the windshield so as to capture image data representative of the scene occurring forward of the vehicle (FIG. 1). Optionally, the system may include multiple exterior viewing imaging sensors or cameras, such as a forward viewing camera at the front of the vehicle, and a sideward/rearward viewing camera at respective sides of the vehicle, and a rearward viewing camera at the rear of the vehicle, which capture images exterior of the vehicle. The camera or cameras each include a lens for focusing images at or onto an imaging array or imaging plane or imager of the camera. Optionally, the forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 10 includes a control or electronic control unit (ECU) or processor that is operable to process image data captured by the camera or cameras and may detect objects or the like and/or provide displayed images at a display device for viewing by the driver of the vehicle. The data transfer or signal communication from the camera to the ECU may comprise any suitable data or communication link, such as a vehicle network bus or the like of the equipped vehicle.

Cameras have become ubiquitous in automotive and other industries. Traditional environmental testing for automotive cameras measure only the camera sharpness before and after the environmental test(s). Testing sharpness and/or defocus of a camera during the environmental test (i.e., when temperature and/or humidity of the camera's environment is variable) is a challenging task.

Implementations herein include systems and methods for measuring camera sharpness and/or defocus in real time during an environmental test. The sharpness and defocus are measured using a collimator installed on or at or near an environment-controllable chamber. Optionally, the collimator includes submodules such as a light source, a power supply, a target, a focusing lens, and/or a mechanical part (e.g., a lens tube, spacers, etc.). The system or method may include a collimator installed on, at, or near a chamber glass window of the environment-controllable chamber, measurement software, a camera installed within the chamber and having a field of view that includes the chamber window, a tester to retrieve/process the image captured by the camera, and/or configurable chamber parameters such as temperature, humidity and time.

Figure 2:
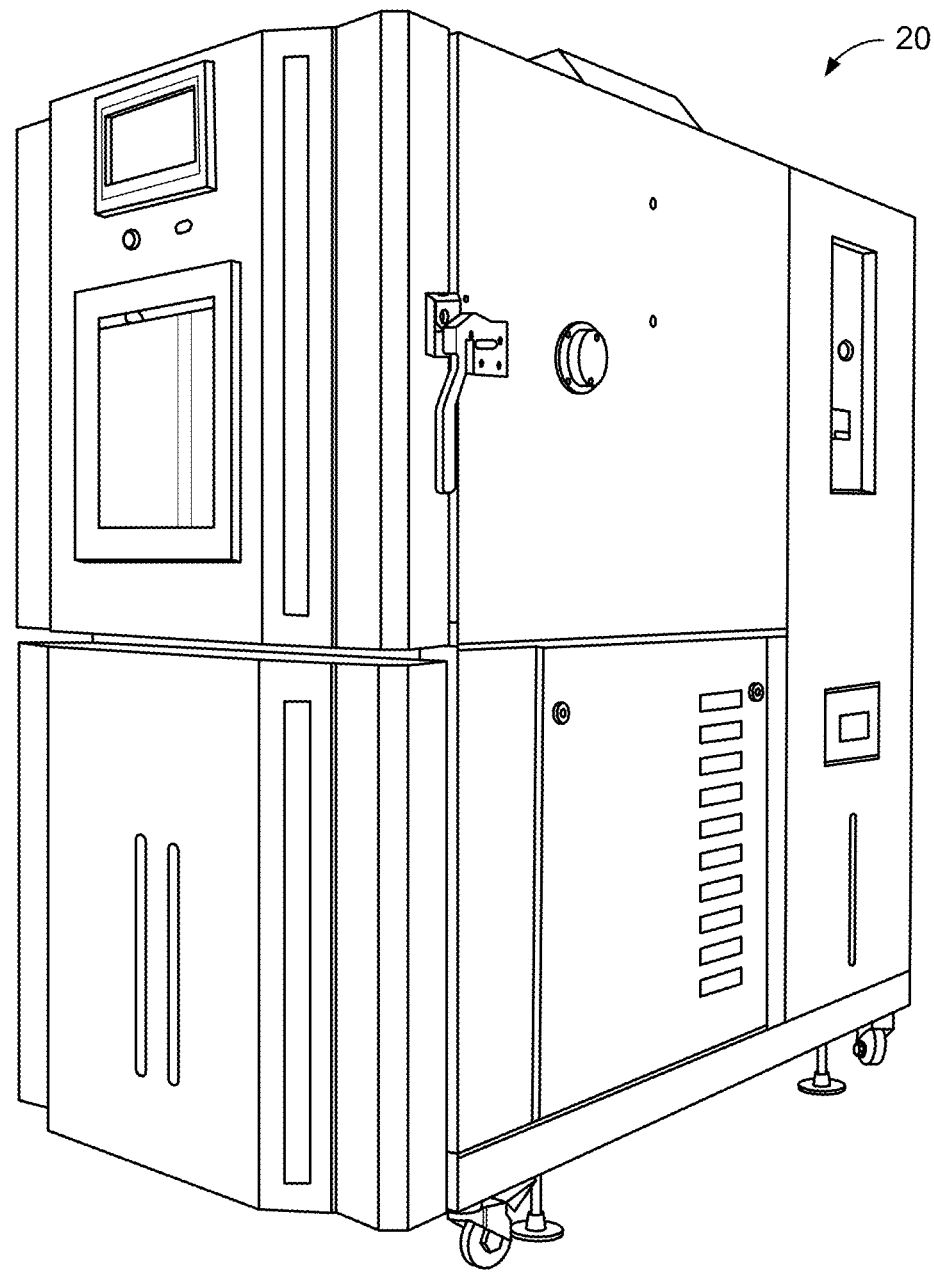
FIG. 2 is a perspective view of an environmentally-controlled chamber.
Figure 3:
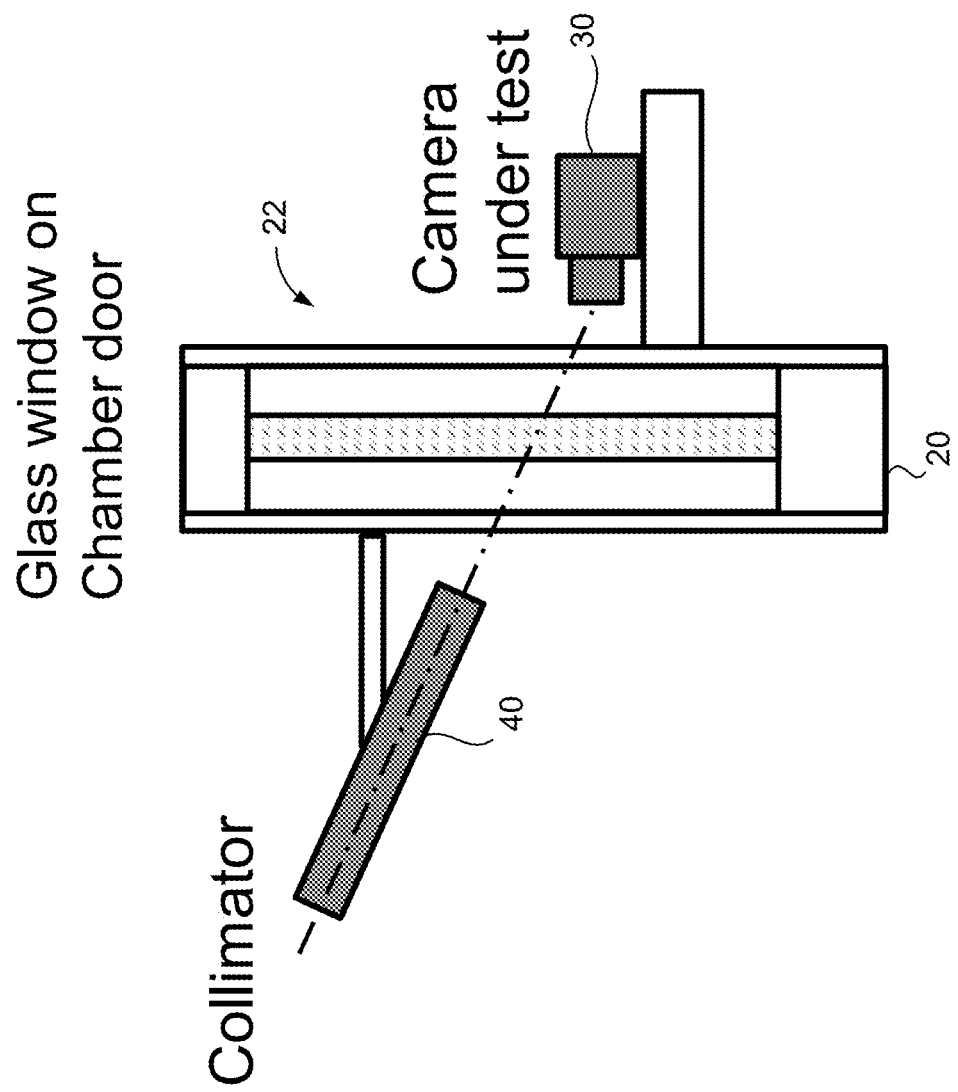
FIG. 3 is a schematic view of a camera under test capturing image data representative of a collimator through a window of a chamber.

FIG. 2 includes an exemplary environmental chamber 20 that may be used to house the camera under test. The chamber 20 allows for any number of environmental conditions be controlled (e.g., temperature, humidity, etc.). As shown in FIG. 3, the chamber 20 includes a window 22 (e.g., a glass or plastic or polycarbonate or other light transmitting material window that allows light to pass into and out of the chamber 20). The camera 30 under test is disposed within the chamber 20 (i.e., where the chamber 20 controls one or more environmental parameters of the camera 30, such as temperature or humidity) and a collimator 40 is disposed outside of the chamber 20 (i.e., where the environmental parameters/conditions are not controlled by the chamber 20). The collimator 40 is directed toward the camera 30 and the camera has a field of view that includes at least partially through the window 22. The camera 30 captures image data representative of light that has passed through the collimator. The collimator 40 may include a target 50 (FIG. 5) and the image data captured by the camera includes a representation of the target. That is, light emitted by the collimator 40 passes through the window of the chamber 20 to produce or project a virtual image of the target within the chamber 20 and the camera 30 views at least a portion of the virtual image and captures image data representative of the virtual target. Thus, the defocus and sharpness of the camera may be tested using the collimator via the target during environmental testing while the camera remains within tightly controlled environmental conditions.

Figure 4:
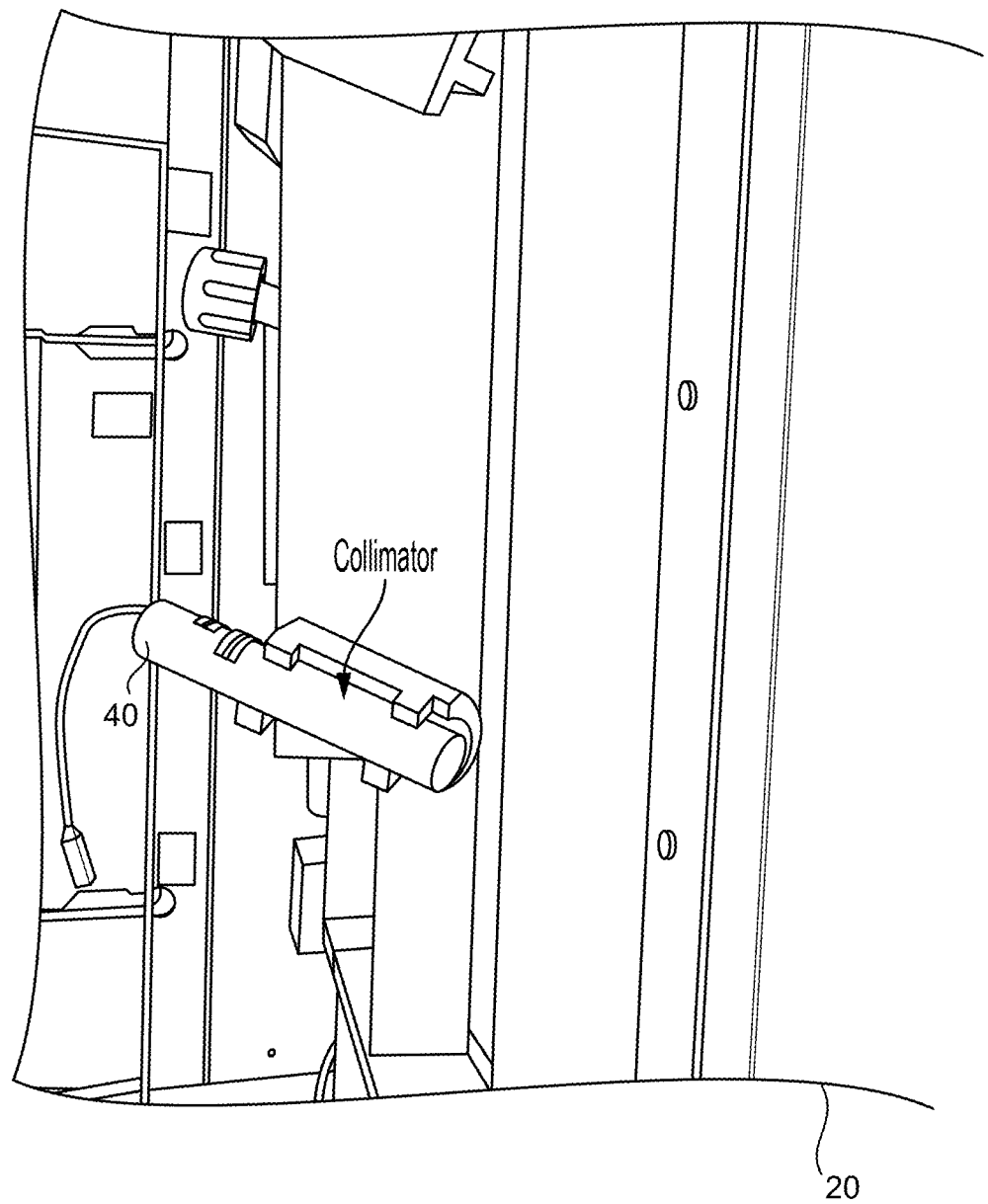
FIG. 4 is a perspective view of a collimator mounted at a chamber.
Figure 5:
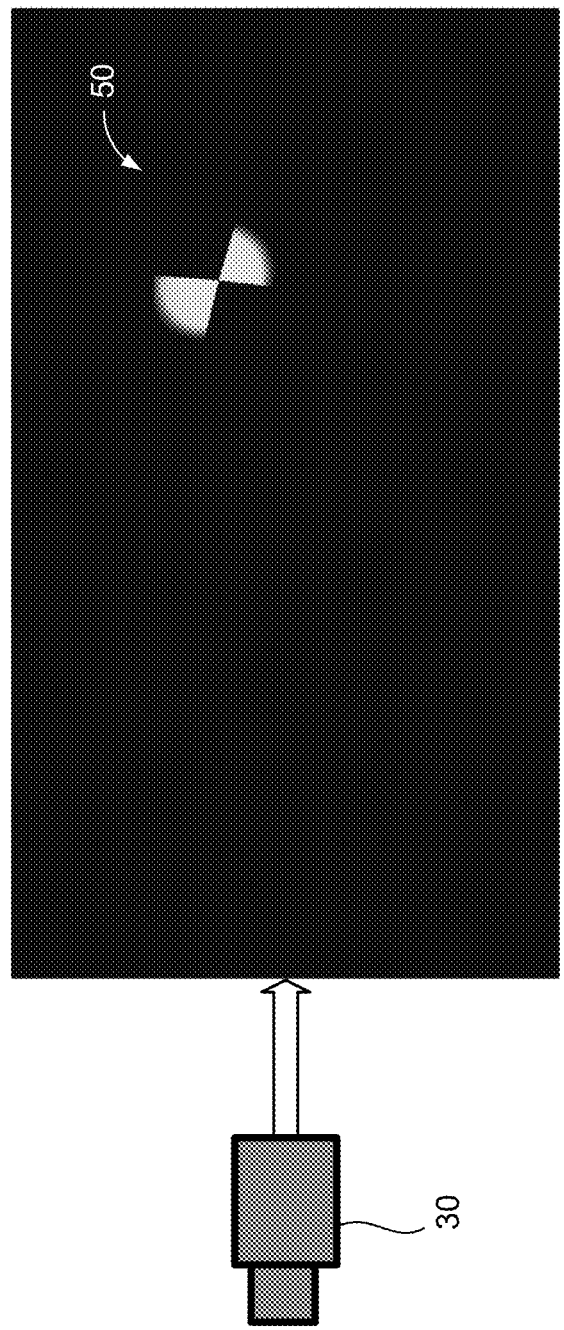
FIG. 5 is a schematic view of a camera capturing image data representative of a target within a collimator.

FIG. 4 includes an example view of the collimator 40 mounted exterior of the chamber 20. The collimator 40 is aligned with the window of the chamber 20 such that light that passes through the collimator 40 enters the chamber 20 via the window of the chamber 20 (and correspondingly, enters the field of view of the camera 30 within the chamber 20). The collimator 40 may be mounted at any position and angle relative to the chamber 20 that allows light that passes through the collimator 40 to enter the chamber 20 via the window. A positionable light source may be positioned in an area to emit light that will pass through the collimator 40 with sufficient intensity for the camera 30 to capture image data representative of the light that passes through the collimator to illuminate a region viewed by the camera. FIG. 5 illustrates the camera 30 capturing an exemplary image that includes light that has passed through the collimator 40 (and the window) when the collimator 40 includes the target 50. The target may be any appropriate image calibration target, such as a defined shape or grid or pattern. By measuring characteristics of the target 50 in the image (e.g., a size, a position, an orientation, a focus, etc.), the sharpness and/or defocus on the camera 30 can be estimated and accommodated or compensated for. For example, based on the characteristics of the target 50 (which may be based on or related to characteristics of the collimator 40, such as a position and/or an angle of the collimator 40 relative to the chamber 20 or camera 30), calibration data may be provided to the camera 30.

Figure 6:
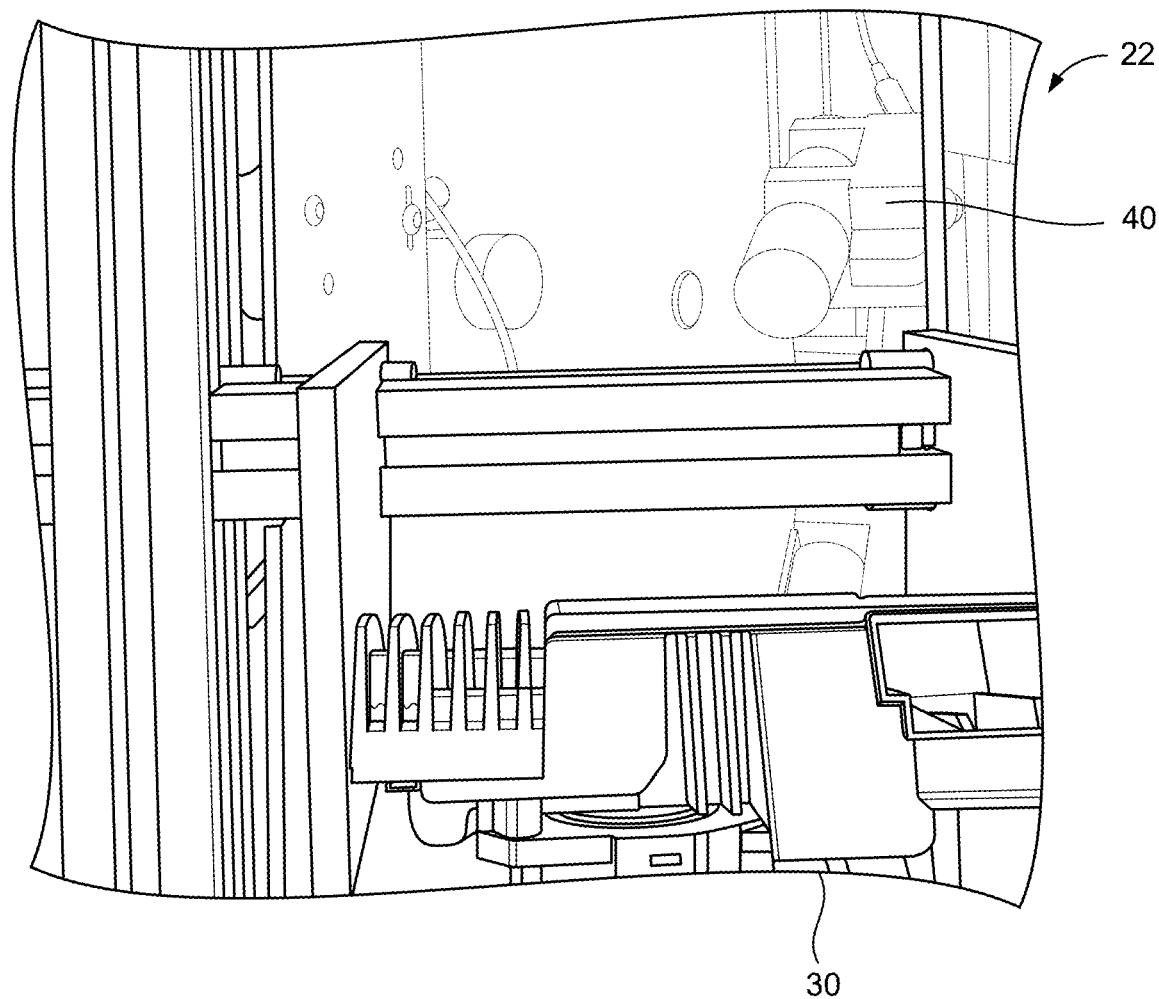
FIG. 6 is a perspective view of a camera disposed within a chamber with a collimator mounted external to the chamber.

The camera 30 may store the calibration data in order to calibrate and/or compensate for any determined deficiencies in sharpness/defocus (or other characteristics) of the camera. The chamber 20 may alter various environmental conditions/parameters of the camera (e.g., temperature, humidity, etc.) and, while the conditions are varied, the sharpness/defocus of the camera 30 may be continually or periodically determined. The calibration data may calibrate the camera for specific environmental conditions. For example, the calibration data may compensate for defocus a first amount when the camera is at a first temperature while the calibration data may compensate for defocus a second amount when the camera is at a second temperature. FIG. 6 includes an image with a point of view of the interior of the chamber 20 with the camera 30 (i.e., an approximate point of view of the camera 30). The collimator 40 is visible through the window 22 of the chamber 20.

Thus, the camera testing systems and methods herein allow for characteristics of a camera 30 to be measured during environmental testing. This allows the characteristics of the camera 30 (e.g., sharpness, defocus, etc.) to be determined at different environmental conditions/parameters. For example, the system includes a collimator that is directed toward a window in an environmentally-controlled chamber. A camera within the chamber captures light that passes through the collimator. Based on the image data captured by the camera, various characteristics of the camera may be determined.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in U.S. Pat. Nos. 10,099,614 and/or 10,071,687, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964;

6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in U.S. Pat. Nos. 10,071,687; 9,900,490; 9,126,525 and/or 9,036,026, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A method for testing a vehicular camera, the method comprising:
    providing a vehicular camera;
    providing an environmentally-controlled chamber, wherein the environmentally-controlled chamber comprises a window allowing visible light to pass from the exterior of the environmentally-controlled chamber into the interior of the environmentally-controlled chamber;
    positioning a light-collimating device exterior the environmentally-controlled chamber, wherein the light-collimating device comprises a target, and wherein the target comprises a defined pattern for image calibration, and wherein, with the light-collimating device operating to emit collimated light, collimated light emitted by the light-collimating device passes through the window of the environmentally-controlled chamber to project a virtual image of the target within the environmentally-controlled chamber;
    disposing the vehicular camera within the interior of the environmentally-controlled chamber, wherein, with the light-collimating device operating to emit collimated light that passes through the window of the environmentally-controlled chamber to project the virtual image of the target within the environmentally-controlled chamber, the vehicular camera views at least a portion of the projected virtual image of the target within the environmentally-controlled chamber;
    with the vehicular camera disposed within the interior of the environmentally-controlled chamber, and with the light-collimating device operating to emit collimated light, capturing image data with the vehicular camera;
    processing, via an image processor, the captured image data; and
    responsive to processing by the image processor of the captured image data, estimating a characteristic of the vehicular camera.

2. The method of claim 1, wherein the estimated characteristic of the vehicular camera comprises at least one selected from the group consisting of (i) imaging sharpness of the vehicular camera and (ii) imaging defocus of the vehicular camera.

3. The method of claim 1, wherein the environmentally-controlled chamber controls at least one selected from the group consisting of (i) a temperature of the environmentally-controlled chamber and (ii) a humidity of the environmentally-controlled chamber.

4. The method of claim 1, wherein estimating the characteristic of the vehicular camera comprises determining, using the captured image data, a characteristic of the projected target.

5. The method of claim 1, further comprising capturing, using measurement software, parameters of the environmentally-controlled chamber.

6. The method of claim 5, wherein the parameters of the environmentally-controlled chamber include at least one selected from the group consisting of (i) temperature, (ii) humidity and (iii) time.

7. The method of claim 1, further comprising determining, based on the estimated characteristic of the vehicular camera, calibration data to compensate for the estimated characteristic, and providing, to the vehicular camera, the calibration data.

8. The method of claim 7, wherein the calibration data is stored at memory of the vehicular camera.

9. The method of claim 1, wherein capturing image data with the vehicular camera comprises capturing first image data when the environmentally-controlled chamber exposes the vehicular camera to a first environmental condition and capturing second image data when the environmentally-controlled chamber exposes the vehicular camera to a second environmental condition.

10. The method of claim 9, wherein estimating the characteristic of the vehicular camera comprises estimating the characteristic when the vehicular camera is exposed to the first environmental condition using the first image data and estimating the characteristic when the vehicular camera is exposed to the second environmental condition using the second image data.

11. The method of claim 1, wherein, with the vehicular camera disposed within the interior of the environmentally-controlled chamber, the vehicular camera at least partially views the light-collimating device through the window of the environmentally-controlled chamber.

12. A method for testing a vehicular camera, the method comprising:
    providing a vehicular camera;
    providing an environmentally-controlled chamber, wherein the environmentally- controlled chamber comprises a window allowing visible light to pass from the exterior of the environmentally-controlled chamber into the interior of the environmentally- controlled chamber;
    positioning a light-collimating device exterior the environmentally-controlled chamber, wherein the light-collimating device comprises a target, and wherein the target comprises a defined pattern for image calibration, and wherein, with the light-collimating device operating to emit collimated light, collimated light emitted by the light-collimating device passes through the window of the environmentally-controlled chamber to project a virtual image of the target within the environmentally-controlled chamber;

disposing the vehicular camera within the interior of the environmentally-controlled chamber, wherein, with the light-collimating device operating to emit collimated light that passes through the window of the environmentally-controlled chamber to project the virtual image of the target within the environmentally-controlled chamber, the vehicular camera views at least a portion of the projected virtual image of the target within the environmentally-controlled chamber;

with the vehicular camera disposed within the interior of the environmentally- controlled chamber, and with the light-collimating device operating to emit collimated light, capturing image data with the vehicular camera;

processing, via an image processor, the captured image data;

responsive to processing by the image processor of the captured image data, determining, using the captured image data, a characteristic of the projected virtual image of the target; and responsive to determining the characteristic of the projected virtual image of the target, estimating a characteristic of the vehicular camera, wherein the estimated characteristic of the vehicular camera comprises at least one selected from the group consisting of (i) imaging sharpness of the vehicular camera and (ii) imaging defocus of the vehicular camera.

13. The method of claim 12, wherein the environmentally-controlled chamber controls at least one selected from the group consisting of (i) a temperature of the environmentally-controlled chamber and (ii) a humidity of the environmentally-controlled chamber.

14. The method of claim 12, further comprising determining, based on the estimated characteristic of the vehicular camera, calibration data to compensate for the estimated characteristic, and providing, to the vehicular camera, the calibration data.

15. The method of claim 14, wherein the calibration data is stored at memory of the vehicular camera.

16. The method of claim 12, wherein capturing image data with the vehicular camera comprises capturing first image data when the environmentally-controlled chamber exposes the vehicular camera to a first environmental condition and capturing second image data when the environmentally-controlled chamber exposes the vehicular camera to a second environmental condition.

17. The method of claim 16, wherein estimating the characteristic of the vehicular camera comprises estimating the characteristic when the vehicular camera is exposed to the first environmental condition using the first image data and estimating the characteristic when the vehicular camera is exposed to the second environmental condition using the second image data.

18. A method for testing a vehicular camera, the method comprising:

providing a vehicular camera;

providing an environmentally-controlled chamber, wherein the environmentally-controlled chamber comprises a window allowing visible light to pass from the exterior of the environmentally-controlled chamber into the interior of the environmentally-controlled chamber;

positioning a light-collimating device exterior the environmentally-controlled chamber, wherein the light-collimating device comprises a target, and wherein the target comprises a defined pattern for image calibration, and wherein, with the light-collimating device operating to emit collimated light, collimated light emitted by the light-collimating device passes through the window of the environmentally-controlled chamber to project a virtual image of the target within the environmentally-controlled chamber;

disposing the vehicular camera within the interior of the environmentally-controlled chamber, wherein, with the light-collimating device operating to emit collimated light that passes through the window of the environmentally-controlled chamber to project the virtual image of the target within the environmentally-controlled chamber, the vehicular camera views at least a portion of the projected virtual image of the target within the environmentally-controlled chamber;

with the vehicular camera disposed within the interior of the environmentally-controlled chamber during a first environmental condition of the environmentally-controlled chamber, and with the light-collimating device operating to emit collimated light, capturing first image data with the vehicular camera;

processing, via an image processor, the captured first image data;

responsive to processing by the image processor of the captured first image data, estimating a characteristic of the vehicular camera when the vehicular camera is exposed to the first environmental condition;

after capturing the first image data with the vehicular camera, changing the first environmental condition of the interior of the environmentally-controlled chamber to a second environmental condition;

with the vehicular camera disposed within the interior of the environmentally-controlled chamber during the second environmental condition of the environmentally-controlled chamber, and with the light-collimating device operating to emit collimated light, capturing second image data with the vehicular camera;

processing, via the image processor, the captured second image data;

responsive to processing by the image processor of the captured second image data, estimating the characteristic of the vehicular camera when the vehicular camera is exposed to the second environmental condition; and determining, based on the estimated characteristic of the vehicular camera when exposed to the first environmental condition and the estimated characteristic of the vehicular camera when exposed to the second environmental condition, calibration data to compensate for the estimated characteristic at the first environmental condition and to compensate for the estimated characteristic at the second environmental condition.

19. The method of claim 18, further comprising capturing, using measurement software, parameters of the environmentally-controlled chamber.

20. The method of claim 19, wherein the parameters of the environmentally-controlled chamber include at least one selected from the group consisting of (i) temperature, (ii) humidity and (iii) time.

21. The method of claim 18, wherein the estimated characteristic of the vehicular camera comprises at least one selected from the group consisting of (i) imaging sharpness of the vehicular camera and (ii) imaging defocus of the vehicular camera.

* * * * *